May 8, 1934.  N. S. FOCHT  1,957,452

HYDRAULIC SHOCK ABSORBER

Filed Aug. 18, 1932  2 Sheets-Sheet 1

Inventor
Nevin S. Focht,
By D. P. Wolhaupter
Attorney

May 8, 1934.   N. S. FOCHT   1,957,452
HYDRAULIC SHOCK ABSORBER
Filed Aug. 18, 1932   2 Sheets-Sheet 2
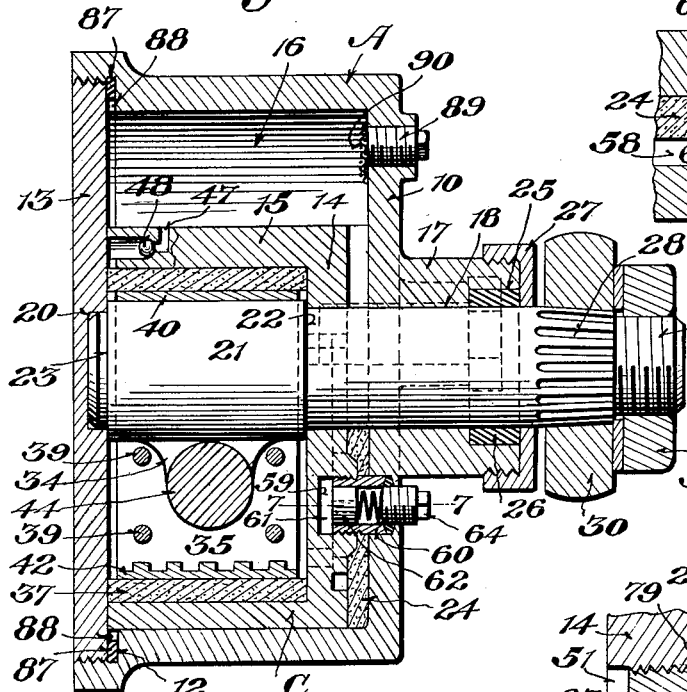
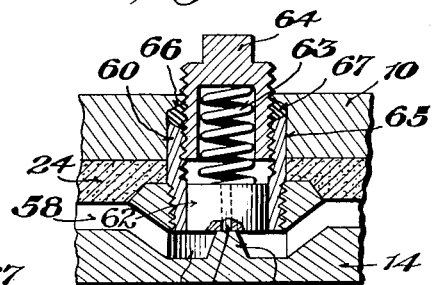
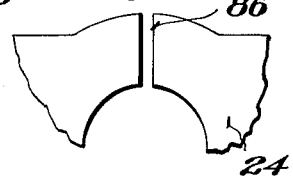
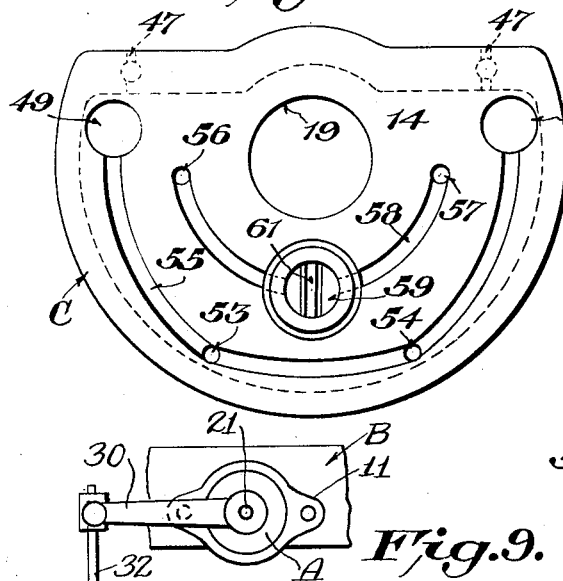
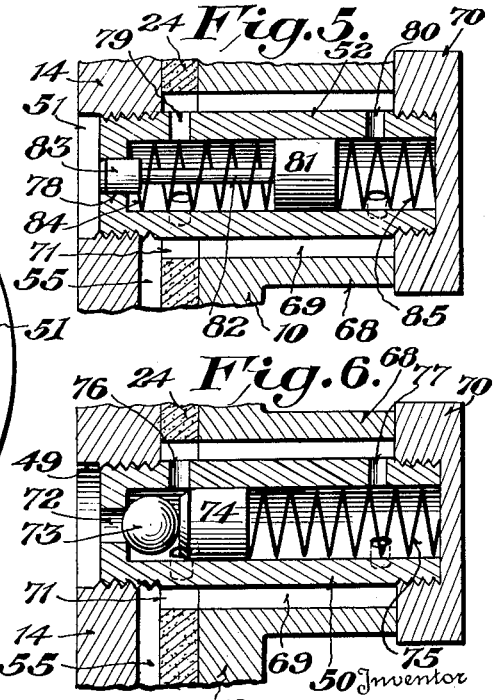
Inventor
Nevin S. Focht,
By N. P. Wochaupter
Attorney Patented May 8, 1934

1,957,452

UNITED STATES PATENT OFFICE 1,957,452

HYDRAULIC SHOCK ABSORBER

Nevin S. Focht, Reading, Pa.

Application August 18, 1932, Serial No. 629,377

12 Claims. (Cl. 188—89)

This invention relates to shock absorbers, particularly intended and adapted for use on motor vehicles to promote riding comfort, and has generally in view to provide an improved shock absorber of the hydraulic type which is of relatively simple, inexpensive construction, and which is thoroughly reliable and highly efficient in operation.

The subject of shock absorption for motor vehicles has received much study, and many devices have been developed which are designed to prevent shocks and jars incident to travel of motor vehicles over rough or uneven surfaces from being transmitted from the running gear through the body suspension springs to the body. However, the study and the developments have almost invariably been based on spring actions from the standpoint of only two major characteristics; namely, compression and rebound. As a matter of fact, there are two additional major characteristics to a full phase vehicle spring action which are as important to be controlled as compression and rebound if easy riding is to be obtained; viz., expansion or distension beyond normal, and return, which actions occur when, for example, the vehicle wheels drop into a depression in the road surface with consequent expansion of the springs beyond normal, and when, subsequently, reflex action of the springs in their return to normal position takes place.

In the average highway there are approximately as many depressions to produce expansion or distension of vehicle springs beyond normal and consequent return or reflex actions as there are elevations to produce compression and consequent rebound of the springs. Moreover, expansion or distension of the springs beyond normal and their subsequent return or reflex action tends to produce substantially the same harsh riding effect as compression and rebound. Accordingly, one of the special and important objects of the invention is to provide a shock absorber which is equally as effective to control expansion beyond normal and accompanying reflex actions of the vehicle springs as to control compression and rebound actions of the springs.

Another special and important object of the invention is to provide a shock absorber of the character mentioned which is substantially equally effective to compensate for abrupt or sudden and major movements of the vehicle springs as for less abrupt and minor movements of the springs both on compression and rebound and on expansion and return.

The present shock absorber is of the type embodying a swinging piston or vane operating within a casing between a pair of pressure chambers to force liquid from one chamber into the other depending upon the direction of movement of the piston. Under the influence of sudden movements of the piston extremely high pressures may be developed within the casing. Accordingly, another important object of the invention is to provide a shock absorber of the character mentioned embodying a construction whereby the possibility of leakage of liquid from the casing under high pressures is substantially eliminated.

Another important object of the invention is to provide a piston or vane of novel construction and to provide for actuating the same in a novel manner by a shaft which is rotated in response to spring flexures so that a fluid-tight engagement of the piston or vane with the casing is maintained at all times irrespective of any looseness of the shaft which may develop as a result of wear.

According to the invention, valves are employed to control the flow of liquid between the pressure chambers, and in this connection another important object of the invention is to provide valves of novel construction arranged to cooperate in a novel manner to so control the flow of the liquid as to compensate in a highly efficient manner for all of the aforementioned movements of the vehicle springs.

Another object of the invention is to provide a shock absorber of the character mentioned which may be quickly assembled and disassembled and which embodies a construction whereby only a minor interchange of parts adapts the same for use either at the front or at the rear and on either side of a vehicle, which is especially important from an economical manufacturing and service standpoint.

With the foregoing and various other objects in view, which will become more fully apparent as the nature of the invention is better understood, the same consists in the novel features of construction, combination and arrangement of parts as will be hereinafter more fully described, illustrated in the accompanying drawings and defined in the appended claims.

In the drawings, wherein like characters of reference denote corresponding parts in the different views:—

Figure 3 is a central vertical section through the shock absorber.

Figure 4 is a front elevation of the inner casing element.

Figure 5 is a section on the line 5—5 of Fig. 2.

Figure 6 is a section on the line 6—6 of Fig. 2.

Figure 7 is a section on the line 7—7 of Fig. 3.

Figure 8 is a detail elevation of a portion of the sealing gasket which is interposed between the front walls of the inner and the outer casing elements; and Figure 9 is a diagrammatic view illustrating the application of the shock absorber to a vehicle.

Figure 1:
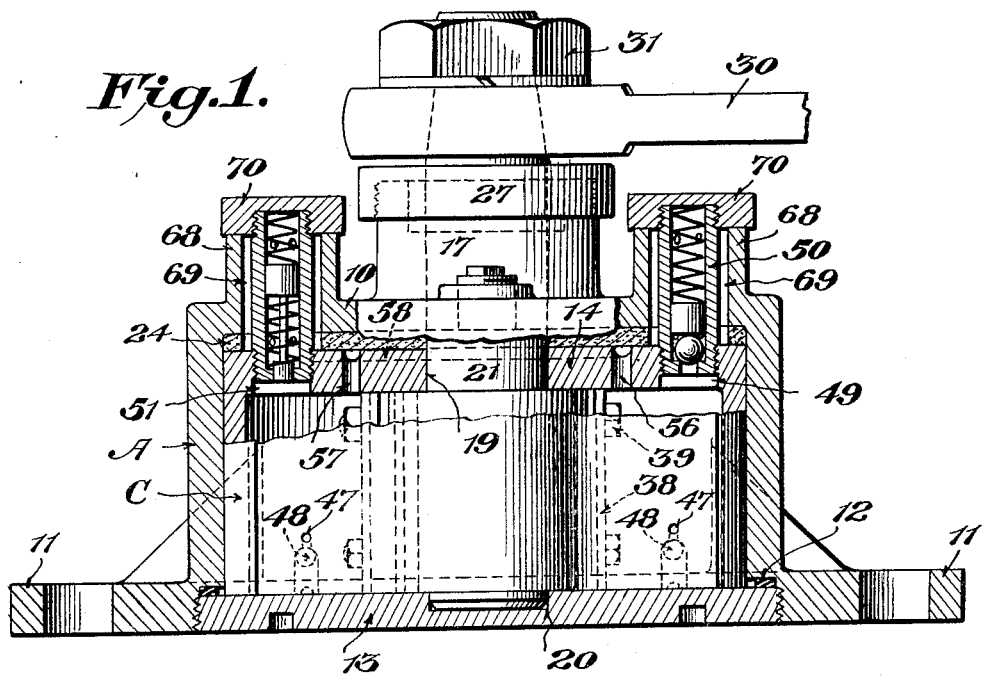
Figure 1 is a view partly in horizontal section and partly in plan elevation of a shock absorber constructed in accordance with the invention.

Referring to the drawings in detail, it will be observed that the present shock absorber, according to the practicable embodiment thereof illustrated in the present instance, includes as one of its principal elements an outer casing, designated generally as A, which is of cylindrical shape, closed at the front, as indicated at 10, open at its rear, and provided with integral lugs 11 apertured for the accommodation of bolts or other fasteners for securing the casing firmly and rigidly to a vehicle frame B as illustrated in Fig. 9 of the drawings.

At the rear of the casing A the bore thereof is enlarged to provide a shoulder 12, and, as shown, the wall surrounding the enlarged portion of said bore is screw-threaded for the reception of a rear closure plate 13.

Formed to fit neatly within the outer casing A is an inner casing C which is of substantially semi-circular shape and which also is closed at its front, as indicated at 14, and open at its rear, said inner casing being insertable into and removable from the outer casing through the open rear end thereof when the rear closure plate 13 of the outer casing is removed.

When operatively inserted within the outer casing A the inner casing C occupies the lower half of the outer casing and the top wall 15 of the inner casing serves to separate the space 16 at the top of the outer casing from the interior of the inner casing, the space 16 according to the invention being utilized as a reservoir for surplus operating liquid. The inner casing is held against rotation relatively to the outer casing by the hereinafter described sleeve 60 shown in Figs. 3 and 7.

Formed as an integral, forward extension of the front wall 10 of the outer casing A is a boss 17 having a bore 18 axially alined with the bore of said casing, while formed through the front wall of the inner casing C is a bore 19 which axially alines with the bore 18 of said boss when the inner casing is operatively inserted within the outer casing. Moreover, the inner face of the rear closure plate 13 of the outer casing is formed with a recess 20 which axially alines with the bores 18 and 19, when said closure plate is disposed in closing relationship to the open rear end of the outer casing.

At 21 is designated an operating shaft which is insertable into and removable from the alined bores 19 and 18 through the open rear ends of the inner and the outer casings when the rear closure plate 13 is removed, said shaft having a shoulder 22 for engagement with the rear face of the front wall 14 of the inner casing and further having a reduced rear end which is received within the recess 20 of the plate 13 when said plate is operatively engaged with the outer casing, the reduced rear end of said shaft providing a shoulder 23 which is engaged by the front face of said plate.

At 24 is designated a gasket which conforms in shape to the inner casing C and which is interposed between the front walls of the respective casings. The inner casing is of a width such that its rear edge is engaged by the closure plate 13 when the latter is screwed tightly into the rear end of the outer casing. Thus, when the inner casing is disposed within the outer casing and the closure plate 13 is applied and tightened the gasket 24 is compressed tightly between the front walls of the respective casings. In this connection it is pointed out that a ground joint is provided between the rear edge of the inner casing and the front face of the closure plate 13 so that when the closure plate is tightened a fluid-tight seal is provided preventing escape of liquid from the inner casing across the rear edge thereof.

In the front end of the boss 17 is formed a packing gland 25 in which is disposed suitable packing 26 which surrounds the shaft 21 and which is compressed against said shaft by a packing nut 27 which is threaded on said boss, thereby providing a seal to prevent any escape of liquid from the outer casing around that portion of the shaft which extends through said boss.

The shaft 21 extends through the boss 17 and the nut 27 and at its front end is formed with a tapered and fluted portion as indicated at 28, and beyond said fluted portion with a thread portion 29.

A lever arm, designated as 30, is formed at one end with a fluted opening to receive the fluted portion of the operating shaft 21 whereby relative rotation between said arm and said shaft is prevented, and a nut 31 is provided for engagement with the threaded portion 29 of said shaft to secure the lever arm thereon. At its other end the lever arm is suitably formed for connection by a link 32 or in other suitable manner with the vehicle axle 33 as illustrated in Fig. 9. Thus, assuming that the casing A is secured to the vehicle frame as aforesaid, it follows that any relative vertical movement between the vehicle axle and the vehicle frame or body, which is supported on the axle by the spring S, results in rotation of the shaft 21.

Normally, that is when the vehicle spring S is disposed in a state of equilibrium, the lever arm 30 is disposed horizontally or approximately horizontally, and when said lever arm is disposed in this position an arm 34 which is formed either integrally with the shaft 21 or which is attached rigidly thereto in any suitable manner, depends directly downwardly from said shaft into the inner casing C and constitutes an actuator for a novel piston vane designated generally as D.

The piston vane D is composed of a metallic body 35, two gasket elements 36 and 37, a pair of clamp plates 38 and bolts 39 for securing said parts in assembly. The metallic body 35 comprises an upper arcuate portion 40 which is curved to fit over and to snugly engage the shaft 21, a pair of sides 41 depending in spaced, parallel relation from said body portion to either side of the shaft 21, and an arcuate portion 42 concentric to the inner peripheral face of the inner casing C, spaced from said face and rigidly connecting the sides 41 together near their outer ends. The gasket element 36 is of substantially U-shape and extends over the arcuate portion 40 of the metallic body 35 and over the outer faces of the sides 41 of said body, engaging at its free end edges with the inner peripheral face of the inner casing. The clamp plates 38 are disposed against the outer faces of the respective side portions of the gasket 36 and are drawn tightly against said gasket by the bolts 39 which extend from side to side of the piston vane, said bolts serving not only to draw the plates 38 against the sides of the gasket 36 and to clamp said gasket sides against the sides 41 of the body 35, but to draw the sides of the body inwardly against the ends of an enlargement 44 of the shaft arm 34, whereby a substantially rigid relationship is maintained between the shaft 21 and the piston vane. The gasket element 37 fills the space between the outer end portions of the sides 41 of the metallic body 35 and between the arcuate portion 42 and the inner peripheral face of the inner casing, both this gasket and the gasket 36 being of a width such that their front and rear edges seal liquid tight against the inner face of the front wall of the inner casing and against the inner face of the closure plate 13, respectively, when the parts are operatively assembled, whereby any escape of liquid around the piston vane from one side to the other thereof is effectively prevented. In this connection it will be observed that the outer face of the upper arcuate portion of the gasket 36 engages the under face of an arcuately curved portion of the top wall 15 of the inner casing, and that, due to the connection of the piston vane as an entirety with the shaft 21 in such manner that the piston vane may shift or float relative to said shaft, the gaskets remain in fluid-tight engagement with the inner faces of the inner cylinder and the closure plate 13 even though play may develop as a result of wear between the shaft 21 and the casing. It is manifest, moreover, that due to the ends of the enlargement 44 of the shaft arm 34 engaging at its ends with the sides 41 of the metallic piston body 35, any rotation of the shaft 21 is positively transmitted to the piston vane.

The piston vane serves to divide the inner chamber into two pressure chambers 45 and 46 which are in communication with the liquid reservoir space 16 through individual passageways 47 formed through the top wall 15 of the inner casing and controlled by check valves 48 opening in the direction of the respective pressure chambers. Normally the shock absorber is completely charged or filled with liquid, and in the event of loss or escape of liquid in any manner from either pressure chamber such loss immediately is compensated by a supply of liquid through one or the other of the valve controlled passageways 47 from the reservoir 16.

Formed through the front wall 14 of the inner casing in such position as to communicate at all times with the pressure chamber 45 is an opening 49 into which is threaded the rear end of a valve casing 50 which projects forwardly beyond said wall 14. Similarly, a second opening 51 is formed through said wall 14 in such position as to communicate at all times with the pressure chamber 46 and has threaded therein the rear end of a valve casing 52 which, like the valve casing 50, projects forwardly beyond said wall 14.

Figure 2:
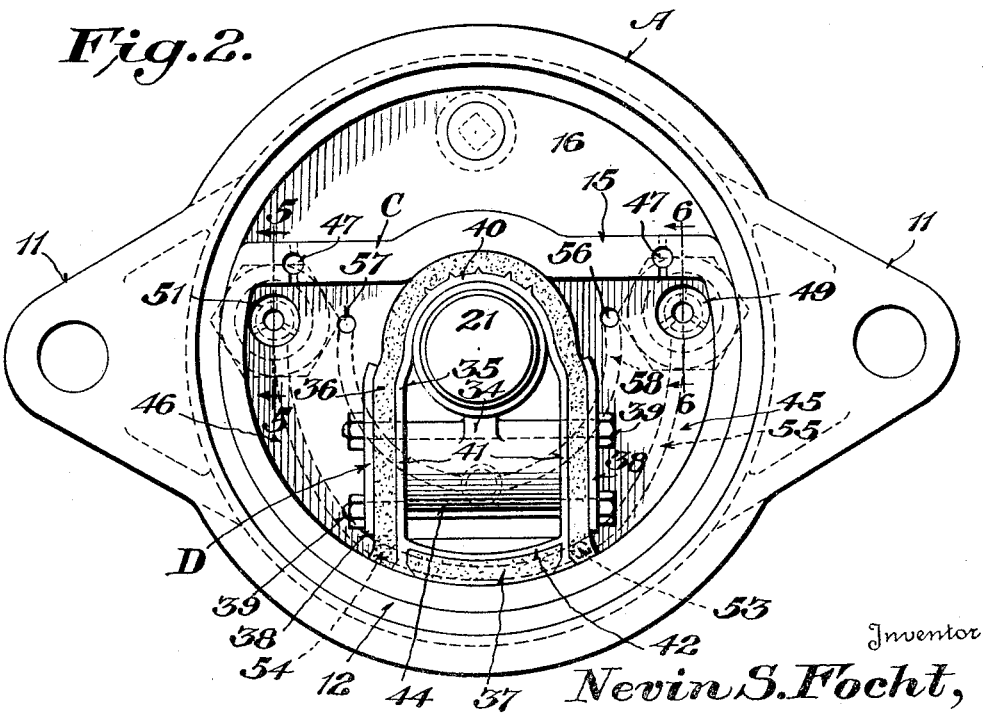
Figure 2 is a rear elevation of the shock absorber with the rear cover plate removed.

Also formed through the front wall 14 of the inner casing is a pair of ports 53 and 54 which are disposed near the inner peripheral face of the inner casing in such spaced relationship as to be covered by the front edges of the side portions, respectively, of the gasket 36 when the piston vane is in its normal position as illustrated in Fig. 2, so that when the piston vane is swung in either direction from its normal position, one of said ports is uncovered and the other is maintained flanked by the front edge of the gasket 37. A channel 55 formed in the front face of the front wall 14 of the inner cylinder connects the ports 53 and 54 and opens at its ends into the openings 49 and 51, this channel being closed at its front by the gasket 24 as is obvious.

Other ports 56 and 57 are formed through the front wall 14 of the inner casing and, like the openings 49 and 51, are positioned to be in communication at all times, respectively, with the pressure chambers 45 and 46. A channel 58 formed in the front face of the front wall 14 connects said ports 56 and 57 and at a medial point is in communication with the inner end of a valve chamber 59 which opens through the front face of said wall 14. Threaded at its rear end into the valve chamber 59 is a sleeve 60 which at its rear end abuts a web or obstruction 61 extending crosswise with respect to the channel 58 so that any flow of liquid through said channel must take place over said web or obstruction and through the rear or inner end portion of said sleeve. Slidable in the sleeve 60 is a disk valve 62 which is urged constantly in the direction of and normally against the web or obstruction 61 by a coil spring 63 interposed between said valve and an adjustable plug 64 threaded into the front or outer end of the sleeve 60. Thus, flow of liquid through the channel 58 normally is prevented by the valve 62, and any flow of liquid through said port is throttled by said valve and is against the pressure of the spring 63. Preferably a small port 62' is formed centrally through the valve 62 from end to end thereof so as to be closed by the web or obstruction 61 when the valve 62 is seated thereagainst and to be uncovered when said valve is unseated. Consequently, whenever the valve 62 is opened by pressure of liquid thereagainst the port 62' provides for a balancing of the liquid pressure against the respective ends of the valve with consequent smooth operation of said valve, the valve constituting the piston of a dash pot to cushion opening movement of the valve.

The gasket 24 is provided with an opening to accommodate the sleeve 60 and the inner face of the front wall 10 of the outer casing is recessed as indicated at 65 to accommodate the outer end of said sleeve, the said recess being reduced in diameter where it opens through the outer face of the wall 10 to accommodate the plug 64 and to provide a shoulder 66. In the recess 65 is disposed suitable packing material 67 so that when the inner casing with the sleeve 60 threaded therein is inserted into the outer casing and the sleeve 60 enters the recess 65, subsequent tightening of the closure plate 13 forces the sleeve forwardly with consequent compression of the packing 67 between the outer end of the sleeve and the shoulder 66 and around the plug 64, thereby providing a liquid-tight seal at this point.

The valve casings 50, 52 extend forwardly through forwardly projecting bosses 68 formed as integral parts of the outer casing A, the said bosses having bores of greater diameter than the valve casings whereby the latter are surrounded by liquid spaces 69. On the outer end of each valve casing is threaded a closure cap 70, and these caps seat liquid tight against the outer ends of the bosses 68 and thus serve to close the outer ends of the liquid spaces 69.

The gasket 24 is provided with openings 71 of greater diameter than the valve casings 50, 52 through which said valve casings extend. The spaces 69 surrounding the valve casings thus are in communication with the channel 55 but at their inner ends are otherwise closed by the front face of the front wall 14 of the inner casing.

Formed through the rear or inner end of the valve casing 50 is a port 72 which is controlled by a ball valve 73 disposed within said valve casing for opening movement outwardly with respect to the pressure chamber 45. Slidable within the valve casing is a piston 74, and between this piston and the outer end of the valve casing is arranged a coil spring 75 which tends constantly to urge the piston inwardly against the valve 73 and to hold said valve seated in closing relationship to the port 72, which is the normal position of said valve when the piston vane is in its normal position illustrated in Fig. 2.

Formed through the valve casing 50 at a point or points to provide constant communication between the inner end of the valve chamber and the liquid space 69 surrounding the same is one or more ports 76, while also formed through said valve casing near the outer end thereof to provide constant communication between the liquid space 69 and the outer end of the valve chamber is one or more ports 77.

The rear or inner end of the valve casing 52 has formed therethrough a port 78, and said casing, like the casing 50, has ports 79 and 80 formed therethrough near its inner and outer ends, respectively, providing constant communication of its inner and outer ends with the surrounding liquid space 69.

Within the valve casing 52 is slidably mounted a piston 81, and connected with this piston by a rod 82 is a valve 83 which normally occupies and closes the port 78. Between the piston 81 and the outer end of the valve casing is a coil spring 84, while between the piston and the inner end of the valve casing is a coil spring 85, which springs cooperate to hold the piston and the valve normally in the positions illustrated in Fig. 5 with the valve 83 closing the port 78 and the piston disposed between the ports 79 and 80.

Assuming the shock absorber to be charged with liquid and to be mounted as illustrated in Fig. 9, with the piston vane in the position shown in Fig. 2, the operation is as follows: If the vehicle wheels meet an obstruction or elevation in the road with consequent compression of the vehicle spring S, the lever arm 30 is swung upwardly and the piston vane as illustrated in Fig. 2 is swung to the right, thereby imposing pressure on the liquid within the pressure chamber 45 proportionate to the spring compression and the amplitude of movement of the lever arm 30. The spring 63 is stronger than the spring 75. Therefore, as the piston vane swings into the pressure chamber 45 the pressure of the liquid against the ball valve 73 causes said valve to open and to permit escape of liquid from the chamber 45 through the ports 72, 76 the channel 55 and the uncovered port 54 into the pressure chamber 46. If the movement of the piston vane is not sudden nor extensive the valve 62 may remain closed, but if the movement of the vane is so sudden and extensive as to build up such a high pressure within the chamber 45 as not to be relieved by opening of the valve 73, then the valve 62 is forced open against the spring 63 and the liquid escapes also by channel 58 and port 57 into chamber 46. In either event the flow of liquid from the chamber 45 is throttled by the valve 73 under the influence of the spring, and since, when the valve 73 is opened, the pressure of the liquid against both ends of the piston 74 is equalized because of the provision of the liquid space 69 which communicates with the respective ends of the valve casing 50, it follows that the spring 75 can be of such sensitiveness as to control opening of the valve 73 to compensate substantially equally as well for small amounts of compression of the spring S as for large amounts of compression thereof, in either event preventing the spring S from being suddenly and violently compressed.

Stated another way, if the obstruction or elevation encountered by the vehicle wheels is a gradual rise, the piston vane moves at low velocity and only a slight pressure is generated within the chamber 45, which the spring 75 controls by permitting the valve 73 to open only under a predetermined pressure equal to the normal compression of said spring. However, if the obstruction or elevation is abrupt, the piston vane moves at high velocity and a high pressure is generated within the chamber 45. This results in a quick opening of the valve 73 which the spring 75 is not adequate to control. At this time the piston 74 comes into play by reason of the balanced pressure of the liquid against the respective ends thereof with the result that a firm force is imposed on the valve 73 restraining its opening movement and thereby opposing violent upward thrust of the lever arm 30. Thus, the car wheels are in effect maintained following the contour of the road, assuring traction and at the same time causing the vehicle body to glide over the elevation rather than to tend to leap over the same.

The action of the valve 73 and its related parts is of special importance because it not only is automatic, but for each force brought to bear upon the lever arm 30 tending to swing the piston vane into the pressure chamber 45, such swinging movement is opposed by a substantially equal or counter-balancing but yet reluctantly yielding force produced within the shock absorber by the imposed force.

Following compression of the vehicle spring S, rebound occurs with consequent movement of the piston vane to the left as illustrated in Fig. 2. The port 53 is covered by the gasket 37, but the port 54 is uncovered, and valve 83 does not open because of the balanced pressure against each end thereof. The liquid attempts to flow by way of the port 54, the channel 55 and the valve 73 into the chamber 45, but the valve 73 closes and prevents such flow. Therefore, when rebound occurs with a consequent rise in pressure of the liquid within the chamber 46 the only avenue of escape of liquid from the chamber 46 is by way of the port 57, the channel 58, the valve 62 and the port 56 back to the chamber 45 at a rate which is controlled by the strength of the spring 63, so that, assuming a proper adjustment of said spring by the plug 64, the rebound, instead of being permitted to occur violently, is required to occur smoothly and without sudden upward movement of the vehicle body relative to the running gear, this being especially true because of the port 62' in the valve 62 providing for balanced or substantially balanced pressure against the respective ends of said valve when the same is opened.

When distension of the vehicle spring S occurs, as, for example, when the vehicle wheels drop into a depression, the piston vane swings to the left from the mid position illustrated in Fig. 2. The liquid attempts to escape from chamber 46 through the port 57 and channel 58, but the valve 83 opens under lower pressure than the valve 62 and the liquid therefore escapes from the chamber 46 by way of the ports 78 and 79, the liquid space 69 surrounding the valve casing 52, the channel 58 and the uncovered port 53 to the pressure chamber 45. As only a slight restraint to opening of the valve 83 is needed to afford the desired throttling of flow of liquid from the chamber 46 during distension of the vehicle spring in order to prevent a sudden dropping of the vehicle running gear relative to the vehicle body, the necessary restraint is afforded by the spring 85.

Following distension of the vehicle spring said spring attempts to regain its lost energy by a reflex action, and when this takes place the piston vane is moved in the direction of the chamber 45, thereby generating pressure in said chamber. The port 54 is covered and the port 53 is uncovered and therefore the two avenues of escape of liquid from the chamber 45 are by way of the port 56, channel 58 and valve 62, and by way of the port 53, channel 55 and the port 78 controlled by the valve 83. The spring 84 is relatively strong and permits opening movement of the valve 83 into the chamber 46 only under a considerably higher pressure than is required to open the valve 62. Consequently, when the piston vane, following movement thereof into the chamber 46 moves in the direction of the chamber 45, the escape of liquid from the chamber 45 under normal conditions is by way of the valve 62 which imposes a throttling action on the flow of the liquid and thereby causes the piston vane to move gently into the chamber 45 with consequent resistance to any violent reflex motion of the vehicle spring. Obviously, in the event of movement of the piston vane in the direction of the chamber 45 so suddenly as to generate an exceptionally high pressure in said chamber, the valve 83 may open against the force of the spring 84 to relieve the high pressure. Moreover, due to the provision of the piston 81 and the arrangement whereby the liquid pressure to which the valve 83 is subjected during its opening movement in either direction, acts in substantially balanced manner against the opposite ends of said piston, and the arrangement whereby opening movement of the valve 62 is counterbalanced or cushioned, each force brought to bear on the lever arm 30 under reflex action of the vehicle spring following distension thereof is opposed by a substantially equal counterbalancing force produced within the shock absorber by the imposed force as in the case of compression and rebound movements of the vehicle spring. Consequently, easy riding qualities of the vehicle body are obtained throughout the four principal phases of action of the vehicle springs, namely, compression, rebound, distension and reflection. In turn, this means that high vehicle speeds may be attained with safety; that side sway is substantially eliminated; that firm traction is maintained; that good braking is attainable at high speeds due to the firm traction; that shimmy and wheel tramp are prevented; that sharp approaches to bridges can be taken at high speeds without fear of the leveling out antecedent to such approches; sharp pitching on wavy concrete or macadam roads is eliminated; there is less danger due to blowouts at high speeds; and that avoidance of pounding of the tires on the road surface increases their life. In fact, due to the dissipation of shocks by the present shock absorber before the shocks are transmitted to the vehicle body, the life of a car equipped with the present shock absorber is prolonged in general.

As previously indicated, a feature of the invention resides in the construction whereby leakage of liquid from the shock absorber is practically eliminated. Referring to Fig. 8 of the drawings, it will be noted that the gasket 24 is provided with a slot 86 extending from the upper edge of the gasket to the opening therein through which the shaft 21 extends. Consequently, any leakage of liquid under pressure from the inner casing around the shaft 21 where it extends through the front wall 14 of said inner casing is free to escape through the slot 86 into the reservoir 16. Thereby any pronounced tendency of the liquid to escape around the shaft outwardly of the gasket is avoided and any liquid which does tend so to escape is stopped by the packing 26.

The ground joint between the rear edge of the inner casing and the front face of the closure plate 13 effectively prevents escape of liquid from the inner casing at this point. However, it will be noted in this connection that a gasket 87 of less internal diameter than the outer casing is interposed between the closure plate 13 and the shoulder 12, thereby providing a channel 88 extending around the inner casing at its rear end and opening into the reservoir 16. Therefore, in the event of any escape of liquid from the inner casing at its rear end, the liquid enters the channel 88 where its pressure is dissipated and the liquid flows freely into the reservoir. From the reservoir, liquid may flow through either of the valve controlled passageways 47 into the inner chamber to maintain the shock absorber at all times completely charged with liquid.

At 89 is designated a plug normally closing a filling opening leading into the reservoir 16, and, as indicated, a screen 90 preferably is provided to cover said filling opening to prevent foreign matter from being introduced into the shock absorber with the operating liquid.

By removing the rear closure plate 13 and disconnecting the lever arm 30 from the shaft 21 it is manifest that the shock absorber may be quickly assembled and disassembled through its open rear end. Moreover, it is equally manifest that simply by reversing or interchanging the valve casings 50, 52 and by connecting the lever arm 30 with the shaft 21 so as to extend in the proper direction therefrom, the one shock absorber may readily be adapted for use at either side and at either the front or the rear of a vehicle.

In Fig. 9 of the drawings the casing A is illustrated as being secured to the vehicle frame B and the lever arm 30 as being connected to the axle or running gear of the vehicle. Obviously, however, this arrangement may be reversed without affecting the mode of operation of the shock absorber. That is to say, the casing A may be secured to the axle or running gear and the lever arm 30 may be connected to the frame. Moreover, insofar as concerns the general mode of operation of the shock absorber it is manifest that a swinging piston vane is by no means essential, as the features of the invention may be embodied in constructions radically different from the construction illustrated.

Although the present shock absorber has been designed more particularly for automotive vehicle suspension it is, because of its flexibility of adjustment, readily adaptable for the vibration dampening of machinery and other mechanisms.

Without further description it is thought that the features and advantages of the invention will be readily apparent to those skilled in the art and it will of course be understood that changes in the form, proportion and minor details of construction may be resorted to, without departing from the spirit of the invention and scope of the appended claims.

I claim:

1. A hydraulic shock absorber comprising a casing, a piston reciprocal within said casing and dividing the same into two separate pressure chambers, means providing communication between said chambers, a valve controlling the flow of liquid from one chamber to the other, and means whereby pressure generated by movement of the piston into one of said chambers imposes a substantially equal counterbalancing pressure on said valve resisting its opening movement under the influence of the pressure generated by movement of the piston.

2. A hydraulic shock absorber comprising a casing, a piston reciprocal within said casing and dividing the same into two separate pressure chambers, means providing two separate avenues of communication between said chambers, and a pair of spring controlled valves related to each pressure chamber normally closing said avenues of communication, respectively, and arranged to be opened against their respective springs by pressure generated by movement of the piston into the related pressure chamber, one valve being common to both pairs and being normally closed by a spring pressure in excess of the spring pressure closing the companion valve.

3. A hydraulic shock absorber comprising a casing, a piston reciprocal within said casing and dividing the same into two separate pressure chambers, means providing communication between said pressure chambers, a spring closed valve controlling flow of liquid between said chambers and arranged to be opened by pressure generated by movement of the piston into one of said chambers, and means whereby upon opening of said valve a liquid closing pressure is exerted thereagainst substantially equal to the pressure generated by movement of the piston.

4. A hydraulic shock absorber as set forth in claim 3 in which another means of communication between the pressure chambers is provided, and in which a spring closed valve is provided controlling flow of liquid through said second means of communication, the closing force normally exerted on said second mentioned valve being in excess of the closing force exerted on the other valve.

5. A hydraulic shock absorber comprising a casing, a piston reciprocal within said casing and dividing the same into two separate pressure chambers, means providing communication between said pressure chambers whereby, when the piston is moved into either pressure chamber, liquid is forced therefrom into the other chamber, a single yieldably restrained valve arranged to be opened and to control flow of liquid in either direction between said pressure chambers by pressure of liquid generated by movement of the piston into either pressure chamber, and means whereby the valve is subjected to a closing liquid pressure substantially equal to the opening liquid pressure exerted thereagainst by movement of the piston into either pressure chamber.

6. A hydraulic shock absorber comprising a casing, a piston reciprocal within said casing and dividing the same into two separate pressure chambers, means providing communication between said pressure chambers whereby, when the piston is moved into either pressure chamber, liquid is forced therefrom into the other chamber, a valve normally closing said means of communication and arranged to be opened by pressure of liquid generated by movement of the piston into either pressure chamber, and a pair of springs cooperating to maintain said valve normally closed and operating, respectively, to resist opening movement thereof in opposite directions.

7. A hydraulic shock absorber comprising a casing, a piston reciprocal within said casing and dividing the same into two separate pressure chambers, means providing communication between said pressure chambers whereby, when the piston is moved into either pressure chamber, liquid is forced therefrom into the other pressure chamber, a yieldably restrained valve normally closing said means of communication and arranged to be opened by pressure of liquid generated by movement of the piston into either pressure chamber, means providing a second avenue of communication between said pressure chamber, and a yieldably closed valve normally closing said second mentioned avenue of communication and arranged to be opened by pressure of liquid generated by movement of said piston into either pressure chamber, the yieldable restraining force exerted in one direction on the first mentioned valve being greater and in the other direction less than the yieldable closing force exerted on said second mentioned valve.

8. A hydraulic shock absorber comprising a casing, a piston reciprocal within said casing and dividing the same into two separate pressure chambers, means providing an avenue of communication between said pressure chambers, a spring closed valve related to one of said pressure chambers and normally denying communication through said avenue, said valve being arranged to be opened by pressure of liquid generated by movement of the piston into the related pressure chamber, means whereby, upon opening of said valve, the same is subjected to a substantially counterbalancing liquid closing pressure, another valve related to the other pressure chamber and arranged to be opened in one direction by pressure of liquid generated by movement of the piston into one of said chambers and in the other direction by pressure of liquid generated by movement of the piston into the other chamber, a pair of springs respectively resisting opening movement of said second mentioned valve in said two directions, one of said springs being stronger than the other, means providing a second avenue of communication between said pressure chambers, and a spring closed valve normally closing said second avenue of communication and arranged to be opened by pressure of liquid generated by movement of the piston into either pressure chamber, the closing force exerted on said last mentioned valve being greater than the closing force exerted on the first mentioned valve, and being greater than the closing force exerted on the second mentioned valve in one direction and less than the closing force exerted on the second mentioned valve in the other direction.

9. A hydraulic shock absorber comprising a substantially cylindrical outer casing closed at its front and open at its rear, a substantially semi-cylindrical inner casing fitting within said outer and cooperating with the outer casing to provide a liquid reservoir between said casings, said inner casing being closed at its front and open at its rear, a rear closure plate for the outer casing serving to hold the inner casing therein and to close the open rear end of the inner casing, a shaft extending through the front walls of said casings into the inner casing, a piston connected to said shaft and disposed within the inner casing and dividing the same into two separate pressure chambers, means providing communication between said pressure chambers, valves controlling said means of communication, and means for the non-return flow of liquid from said reservoir into said pressure chambers.

10. A hydraulic shock absorber comprising a casing, a piston reciprocal therein and dividing the same into two separate pressure chambers, means providing communication between said pressure chambers, and a valve assembly controlling said means of communication, said valve assembly comprising a valve casing having a port in one end thereof opening into one of said chambers, a valve within said casing arranged to be moved to open position by liquid under pressure flowing from said pressure chamber through said port, means providing a liquid space outwardly of said valve casing, the valve casing having ports therein near the ends thereof providing communication between the interior of the valve casing and said liquid space, a piston slidable within said valve casing, and a spring operating against said piston and tending constantly to urge the same against said valve to move the valve to a closed position.

11. A hydraulic shock absorber comprising a casing, a piston reciprocal therein and dividing the same into two separate pressure chambers, a valve casing having an end port exposed to one of said pressure chambers, means providing a liquid space outwardly of said valve casing and outwardly of said pressure chamber, means providing communication between said liquid space and the other pressure chamber, means providing communication between the ends of said valve casing and said liquid space, a valve disposed normally in the end port of said valve casing closing said port and mounted to be moved either inwardly or outwardly relative to the related pressure chamber to open said port, a piston within said valve casing connected to said valve, and a pair of springs operating against opposite ends of said piston and tending to maintain the valve in a position normally closing the end port in said casing.

12. A hydraulic shock absorber comprising a casing, an operating shaft extending into said casing, a piston comprising a metallic frame extending over said shaft and a gasket covering said frame and engaging the walls of the casing, a driving connection between said shaft and said piston permitting shifting movement of the piston in all directions relative to the shaft, the piston dividing the casing into two separate pressure chambers, and valve controlled means of communication between said pressure chambers.

NEVIN S. FOCHT.